United States Patent [19]
Binish

[11] Patent Number: 5,007,532
[45] Date of Patent: Apr. 16, 1991

[54] VISOR AND METHOD FOR MAKING THE SAME
[75] Inventor: Patrick W. Binish, Holland, Mich.
[73] Assignee: Prince Corporation, Holland, Mich.
[21] Appl. No.: 439,451
[22] Filed: Nov. 20, 1989
[51] Int. Cl.$^5$ .............................................. B60J 3/02
[52] U.S. Cl. ..................................... 296/97.1; 29/91.1
[58] Field of Search ......................... 296/97.1; 29/91.1
[56] References Cited
U.S. PATENT DOCUMENTS
4,458,938  7/1984  Viertel et al. ......................... 296/97
4,570,990  2/1986  Flowerday ......................... 296/97.1

FOREIGN PATENT DOCUMENTS
90428  4/1988  Japan .

Primary Examiner—Robert R. Song
Attorney, Agent, or Firm—Price, Heneveld, Cooper, DeWitt & Litton

[57] ABSTRACT

A visor is disclosed of the type used in an automobile. The visor has a self-supporting cardboard butterfly inner support which is covered with a decorative material. The butterfly is folded to form opposing edges and a urethane adhesive is used to bind the sides of the butterfly together and to clamp the decorative material in place. The adhesive contacts the edge of the decorative material contained within the folded butterfly and fixes it firmly in place. As the urethane resin cures, it expands to form a rigid foam member which forms a stiffening member for the visor. A torque member is attached to the visor within the folded butterfly and has a member for attachment to the ceiling of an automobile. The method of making the visor is also disclosed.

42 Claims, 1 Drawing Sheet

VISOR AND METHOD FOR MAKING THE SAME

BACKGROUND OF THE INVENTION

The visors used in automobiles to protect the eyes of the driver and of the front seat passenger from direct sunlight or glare have undergone a substantial change over the years. What appears to be a simple device is actually a complex structure having a hardboard, fiberboard or molded plastic inner core which is covered with padding and then a decorative cover. A torque or visor pivot rod mechanism is also included for holding the visor in the stored position or to allow the visor to be set at the position which provides the preferred shade for the driver's or passenger's eyes, the use position.

In a typical visor, a molded plastic or hardboard frame is used to establish the overall configuration of the visor. In many cases, paper or thin cardboard, in what is called a butterfly configuration, is then folded over the plastic frame or hardboard. Foam padding is then glued to the paper butterfly and then the entire configuration is covered with a decorative material which is sewn in place about the edge of the visor. In some constructions, the foam padding has been placed underneath the paper butterfly with the decorative material being completely glued to the paper butterfly and wrapped around the padded core of the visor.

U.S. Pat. No. 4,570,990, issued Feb. 18, 1986, to Flowerday and assigned to the assignee of the present invention, is typical of the prior art visor construction. The patent discloses an automobile type visor employing a molded plastic core. The edge of the upholstery material is fastened by adhesive about the edge of the molded plastic core and then the core is folded and fused to join the core halves together to additionally secure the edge portions of the decorative material by compressing the upholstery material around the periphery between the facing peripheral edges of the core halves.

In all of the constructions of visors seen to date, a core member of some type has been used upon which the visor is assembled.

SUMMARY OF THE INVENTION

In accordance with the present invention, an improved substantially simplified visor has been developed in which a self-supporting preformed cardboard member is covered with a decorative material and then folded to provide abutting edges. The cardboard material is formed to raise the center portion of each butterfly wing relative to the surrounding edge. When the wings of the butterfly are closed together, the edges abut and the raised center portion provides thickness to the visor. Before the cardboard is folded, adhesive is applied near one edge of the interior of the cardboard member. The cardboard core is then folded, bringing one edge into contact with the other, and the edge of the covering material is folded into the space between the two abutting cardboard edges. The assembly is then held together to allow the adhesive to firmly grip both cardboard faces and the edge of the decorative material which projects into the cardboard core. The adhesive expands to form a rigid foam member which not only adheres the two cardboard surfaces together, but also adheres to and fills any crevice and opening in the edge of the decorative material to firmly hold it in place. No inner core support is used in this construction of the visor which substantially simplifies the construction of the visor and reduces the expense by eliminating the core support and all the parts associated with the core support.

In the improved visor of the present invention, the adhesive performs multiple functions. It expands to fill the portion of the cavity in the visor adjacent the abutting edges. It firmly attaches the two cardboard faces together, secures the decorative covering material in place and forms a rigid stiffening member for the edge of the visor. It also simplifies the construction of the visor and eliminates the need for a heavy inner core which was previously used to clamp the decorative material in place on the outer surface of the visor.

DETAILED DESCRIPTION OF THE PREFERRED EMBODIMENTS

Figure 1:
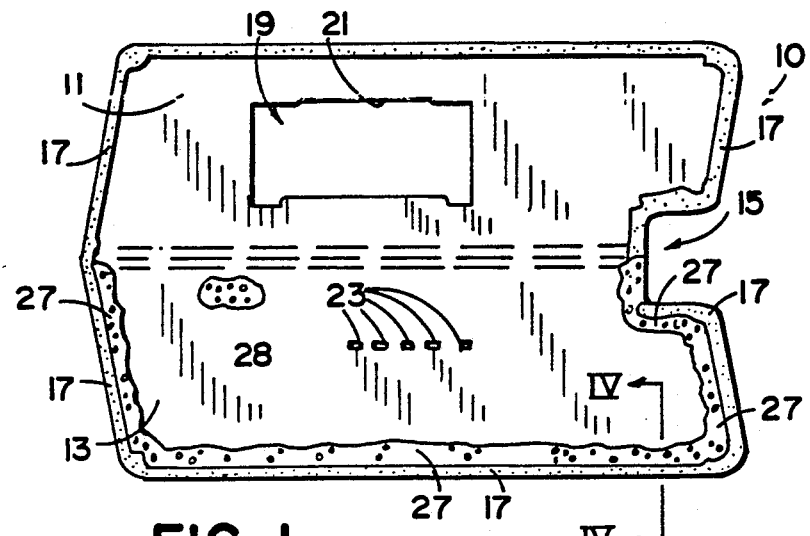
FIG. 1 is an elevational view of an open visor assembly showing the butterfly core, the decorative fabric and adhesive in place along one edge of the core.

Referring to FIG. 1, the visor assembly is indicated generally by the number 10. The visor has an inner core made of the walls 11 and 13 preferably formed in one butterfly-like piece of a thin self-supporting material. The walls or wings 11 and 13 can be prepared by a die cutting or stamping procedure, or by molding depending upon the material. The walls or wings 11 and 13 are intended to be folded, as shown by the directional arrow, about the crease lines indicated generally by the number 15. The crease lines provide a living hinge for the butterfly. Although within the narrowest aspect of this invention a paper derivative material is the preferred material from which the walls 11 and 13 are formed. Any compression formed composite natural or synthetic material can be used. The walls can be approximately 0.040 inch to 0.100 inch in thickness. The thin wall material is supported by the adhesive while thicker materials are unnecessary and thereby add expense.

The preferred wall material is a cardboard formed of laminate of kraft paper 0.080 inch in thickness and having a thin sheet of plastic film under each outer layer of paper to provide wet strength. The material is sold under the trademark VALDOR by Fiber Converters of Three Rivers, Mich. Similar materials are also available from other suppliers. The most important requirement for the wall material is that it be capable of being formed, be self-supporting and be compatible with the adhesive used, that is, nonreactive and capable of being wet or adhered to by the adhesive. In addition to cardboard and composite materials, plastic materials meeting these physical requirements can also be used as suitable wall materials for the visor.

The outer surface of the visor 10 is covered with a decorative material 17 which completely covers the outer or exposed surface of the visor. The decorative material 17 can be cloth, leather, or preferably a vinyl or fabric outer sheet integrally bonded to a polymeric foam backing material. Within the broadest aspect of this invention it is conceivable that the outer surfaces of the walls 11 and 13 would have decorative surfaces or a flock coating applied thereto before or after being secured together, thus eliminating the need for a separate decorative material. Also, within the broadest aspect of this invention, a material formed into a sleeve can be slipped over the body formed by the two halves.

Figure 4:
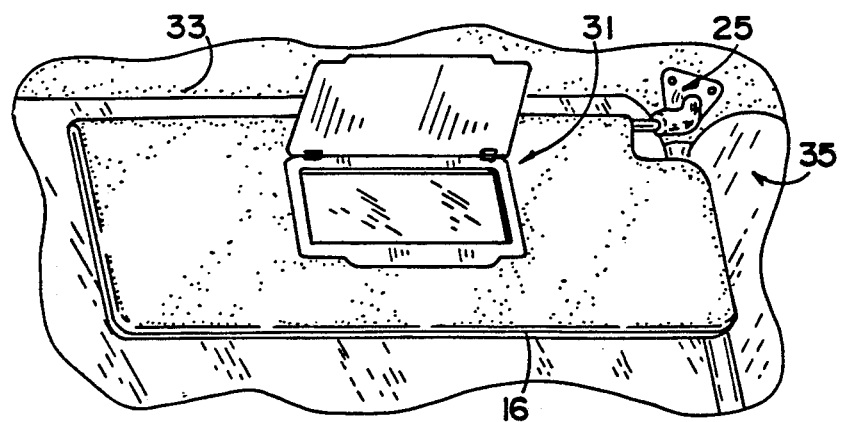
FIG. 4 is a perspective view showing the visor in place in an automobile and with a vanity mirror installed and open in the visor.

The butterfly-like wing 11 has an opening 19 which is bounded by the edges 21. The butterfly-like wing 13 has a row of perforations 23 which are used to support a spring and detent member (not shown) which is used to hold the visor 10 on a pivot rod assembly 25 (FIG. 4). A suitable visor pivot rod assembly is disclosed in U.S. patent application Ser. No. 413,235, filed Sept. 27, 1989, in the name of M. Lanser et al. assigned to the assignee of the instant application, and incorporated herein by reference.

As shown in FIG. 1, the decorative material 17 covers the free edges of the butterfly wings 11 and 13. The material 17 is held in place on the cardboard core during the visor assembly process. Before the core is folded closed, a layer of adhesive 27 is applied adjacent the edge of the butterfly wing 13 in contact with the edge of the fabric material 17 which is turned inward over the edge of the butterfly wing. The adhesive 27 contacts the cardboard core and the edge of the decorative material. Since the butterfly is substantially symmetrical, when wing 11 is folded over wing 13 the adhesive 27 will contact the inner surface of the butterfly-like wing 11 and the edge of the decorative material covering the edge of the butterfly wing 11. It is only necessary to apply the adhesive to one wing of the butterfly in view of the substantially symmetrical construction. Upon folding of the butterfly, the adhesive will be applied to the closed (FIG. 2) wing where it will contact the cardboard core and the edges of the decorative material 17, which covers that wing of the butterfly. A separate deposit of adhesive 28 is made near the hinge to prevent the wings of the butterfly from sliding relative to one another.

While many different adhesives can be used to seal the butterfly wings together to form the visor core, suitable adhesives are preferably applied as a viscous liquid and form a rigid member when cured or reacted; are compatible with the core and decorative cover material; able to withstand temperatures encountered by the interior of an automobile (220° F.). Moisture cured polyurethane resins and hot melt polyamid resins are suitable for use. The preferred adhesive is a rigid urethane foam similar to the type used for insulation purposes. The foam can be either a single urethane resin or, by way of example and not limitation, a two part mixture of a urethane resin and an isocyanate resin. Suitable urethane resins are available from Dow Chemical, Mobay, Tanner Chemical and BASF. The preferred material from BASF is a "TF" foam adhesive which is a mixture of a urethane and an isocyanate resin. The resin includes a hallogenated hydrocarbon blowing agent to cause the material to foam. A foam adhesive is preferred since the foam cuts down on the amount of adhesive material used, and the weight of the adhesive.

Adhesive 27 can be applied from a dispenser having a nozzle which will lay down a bead of the adhesive along the edge of the cardboard butterfly in contact with the edge of the decorative material. The butterfly is closed after application of the adhesive and the urethane resin reacts quickly to foam and form a rigid member which firmly seals the two wings of the butterfly together and firmly attaches and holds the decorative material in place. The decorative material is only loosely held by the edges of the visor core.

Figure 2:
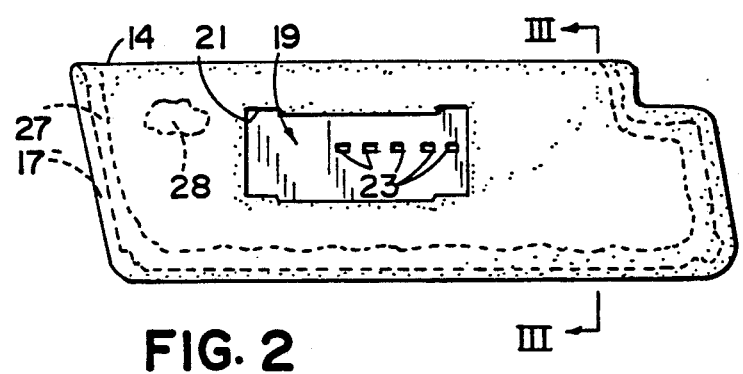
FIG. 2 is an elevational view of the visor of FIG. 1, now closed.
Figure 3:
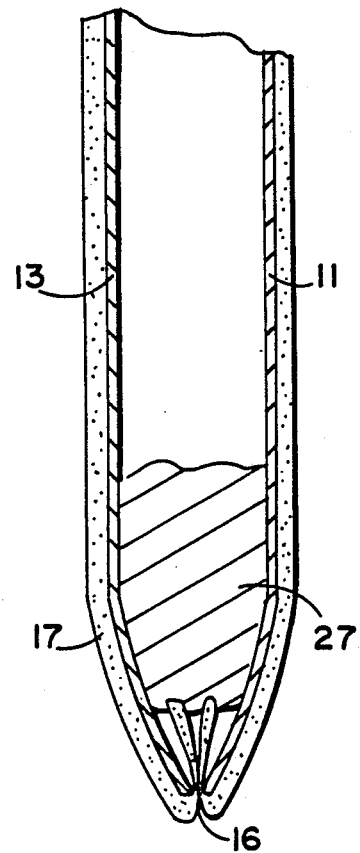
FIG. 3 is an enlarged partial sectional view taken along the line III—III of FIG. 2.

Now referring to FIG. 3, it can be seen that the adhesive 27 expands and becomes a rigid foam-like material. The expansion of the adhesive fills the portion of the cavity within the visor adjacent the abutting edges and any recess or cavities in the decorative cover material to securely adhere the cover to the core. The visor has a smooth leading edge 14 (FIG. 2) caused by the gradual bending of the cardboard butterfly core material about the series to crease lines 15. The crease lines 15 are a series of parallel relief cuts in the surface of the cardboard material which form a living hinge and facilitate the smooth bending of the cardboard core. At the opposite edge of the visor, the decorative material 17 is turned in between the edges of the wings 11 and 13 and forms a smooth trailing edge 16 on the visor with the decorative material being held tightly in place by the adhesive. No stitching is required to hold the decorative material in place. Also, the cardboard core is not intended to clamp the material in place as is the usual practice with polymeric cores, the construction here being much simpler than that with polymeric butterfly cores which rely on a high clamping pressure between the opposed edges of the folded butterfly polymeric material to hold the decorative material in place.

If desired, a vanity mirror 31 can be placed into the open area 19 in the face of the visor, as shown in FIG. 6. The vanity mirror can be glued to the back of the visor 13 with the same adhesive. The back of the mirror should have a safety coating thereon to prevent glass fragments from escaping in the event of an accident. A layer of tape can be used for the safety coating. In FIG. 4, the visor 10 is shown lowered covering a portion of the windshield 35.

The adhesive material 27 cures to become a rigid foam reinforcing member about the edge of the visor (FIG. 2). The cured adhesive gives the visor substantial tortional strength so that it can be manipulated by the driver or passenger in the vehicle without distortion or damage. In the past, the visor had to rely on an internal reinforcing member which added cost and complexity to the visor.

From the above description, it can be seen that a substantially improved automobile visor has been developed using a cardboard or cardboard-like material as a self-supporting, rigid core member. No additional internal structure is needed to support the visor other than the cardboard and the adhesive material which performs multiple functions. The adhesive adheres two wings of the butterfly core together, secures the decorative material in place, and provides a reinforcing member for the edges of the visor.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. An automobile type visor comprising:

a self-supporting relatively thin wall member which is folded to form the core of said visor, said core having abutting edge portions;

a decorative material for covering the outside of said core and having an edge portion turned over the edges of said core into the interior of said core;

a layer of adhesive within and near said abutting edges of said core for holding said core closed and for adhering to said decorative material.

2. An automobile type visor as set forth in claim 1, wherein said core is in a butterfly-like configuration which is folded about a center hinge portion.

3. An automobile type visor as set forth in claim 1, wherein said decorative material has an edge portion which extends beyond the edge of the folded core and said edge portion is turned into said folded core to cover said abutting edges of said core.

4. An automobile type visor as set forth in claim 1, wherein said layer of adhesive is in the form of an expanded bead.

5. An automobile type visor as set forth in claim 1, wherein said adhesive contacts said edge portion of said decorative material and secures said decorative material in place on said core.

6. An automobile type visor as set forth in claim 1, wherein said adhesive is a polyurethane resin which hardens to a rigid foam.

7. An automobile type visor as set forth in claim 1, wherein said adhesive is a mixture of a urethane resin and an isocyanate resin which hardens to a rigid foam.

8. An automobile type visor as set forth in claim 1, wherein a torque member is attached to said visor within said core and has a member for attaching said torque member to said automobile.

9. An automobile type visor as set forth in claim 1, wherein said core is made of cardboard.

10. An automobile type visor as set forth in claim 1, wherein said layer of adhesive fills a portion of the space adjacent said bordering edges of said folded cardboard, firmly attaches the two sides of the cardboard member together, attaches the edge of said decorative cover material to the inside of the cardboard member, and forms a rigid stiffening member for the edge of said visor.

11. A visor comprising:
a self-supporting preformed folded cardboard core having bordering edges;
a material covering the outer surface and bordering edge of said core;
an adhesive for holding said material about said bordering edges of said core and for holding said visor core in a folded condition with said material covering said edges of said core.

12. A visor as set forth in claim 11, wherein said adhesive is a rigid foam.

13. A visor as set forth in claim 11, wherein said adhesive is a polyurethane resin which is hardened to a rigid foam.

14. A visor as set forth in claim 11, wherein said adhesive is a mixture of a urethane resin and an isocyanate resin which hardens to a rigid foam.

15. A visor as set forth in claim 11, wherein a torque member is attached to said core and said torque member has an extending member for attachment to an automobile.

16. A visor as set forth in claim 11, wherein said adhesive contacts and adheres said material to the interior of said core.

17. A visor as set forth in claim 11, wherein said adhesive fills any crevices in said material.

18. A visor as set forth in claim 11, wherein said adhesive forms a rigid expanded bead that fills the inner portion of said core adjacent said opposed bordering edges and the edge of said material within said core.

19. A visor as set forth in claim 11, wherein said adhesive forms an expanded rigid bead that stiffens the edge portion of said visor.

20. A visor as set forth in claim 11, wherein said core is preformed so that when folded the edges abut while the sides of the core away from said abutting edges are spaced apart.

21. A visor as set forth in claim 11, wherein said cardboard core is made of laminated layers of kraft paper.

22. A visor as set forth in claim 11, wherein said cardboard core is made of laminated layers of kraft paper and has a layer of plastic film for providing wet strength.

23. A visor as set forth in claim 11, wherein a vanity mirror is attached to the visor using an adhesive.

24. A visor as set forth in claim 23, wherein said vanity mirror has a safety coating on the back and is fastened to said visor by a layer of adhesive between said safety coating and said visor.

25. A visor as set forth in claim 24, wherein said safety coating and said visor.

26. A visor as set forth in claim 11, wherein said core has an integral living hinge.

27. A visor as let forth in claim 11, wherein said visor core is symmetrical and can be folded about said integral hinge to form abutting edges.

28. A visor as set forth in claim 26, wherein said living hinge is formed by spaced parallel crease lines in said cardboard.

29. A visor as set forth in claim 26, wherein said visor is folded with a curved leading edge by a gradual fold at each crease line of said living hinge.

30. A method of making an automobile type visor comprising the following steps:
providing a substantially self-supporting relatively thin wall member;
providing a decorative cover for one side of said wall member and the edges thereof;
applying a bead of an adhesive material adjacent one edge of said wall member;
folding said wall member and said decorative cover member to form abutting edge portions with said edges of said decorative cover being folded over and covering the abutting edges of said wall member;
curing said adhesive to firmly join together the edges of said wall member and to firmly fasten the edge of said decorative cover between the walls of said wall member.

31. A method for making an automobile type visor as set forth in claim 30, including the additional step of fastening a torque member to said wall member before said wall member is folded.

32. A method for making an automobile type visor as set forth in claim 30, wherein said adhesive expands on curing to fill a portion of the space between said walls adjacent said abutting edges of said folded wall member, firmly attaches the two edges of the wall member together, attaches the edge of said decorative cover material between the walls of the wall member, and forms a rigid stiffening member for the edge of said visor.

33. A method for making an automobile type visor as set forth in claim 30, including the step of preforming said wall member so that when folded the edges of said preformed wall member will abut while the side portions of said wall member will be spaced from each other.

34. An automobile type visor comprising:
a visor body formed by a self-supporting relatively thin material including two wall halves having abutting edge portions;
said edge portions being secured together by a foaming resin hardened to a rigid foam forming a rigid stiffening member at said edges.

35. An automobile type visor as set forth in claim 34 in which the two halves are one piece, hinged together along one edge.

36. The automobile type visor as set forth in claim 34, wherein said foaming resin is a polyurethane resin.

37. The automobile type visor as set forth in claim 34, wherein said foaming resin is a mixture of a urethane resin and an isocyanate resin.

38. The method of making an automobile type visor comprising the following steps:
providing self-supporting, relatively thin wall material shaped into two halves of substantially identical shape;
applying a bead of foaming resin along the free edges of at least one of said halves;
before said bead is foamed and cured, superimposing one of said halves over the other half to form abutting edge portions;
curing said resin to firmly join the abutting edges together, said resin expanding to fill the inner portion of the visor adjacent the said abutting edge portions to give rigidity to the edges.

39. The method as set forth in claim 38 in which the wall material provided is one piece formed of said halves hinged together along one edge and said superimposing of one half over the other half is accomplished by folding said material along the hinge between said halves.

40. The method as set forth in claim 38 in which the resin applied along the said free edges is a mixture of urethane resin and an isocyanate resin which expands and hardens to a rigid foam to give rigidity to said edges.

41. The method as set forth claim 38, wherein said foaming resin is a polyurethane resin.

42. The method as set forth in claim 38, wherein said relatively thin wall material is cardboard.

* * * * *

UNITED STATES PATENT AND TRADEMARK OFFICE
CERTIFICATE OF CORRECTION

PATENT NO. : 5,007,532

DATED : April 16, 1991

INVENTOR(S) : Patrick W. Binish

It is certified that error appears in the above-identified patent and that said Letters Patent is hereby corrected as shown below:

Column 4, line 13;
"to crease" should be --of crease--.

Column 6, line 28 (claim 25);
Delete "and said visor" and insert therefor
--is a layer of tape--.

Signed and Sealed this

First Day of September, 1992

Attest:

DOUGLAS B. COMER

Attesting Officer

Acting Commissioner of Patents and Trademarks